(12) United States Patent
Krishnan et al.

(10) Patent No.: US 8,644,429 B2
(45) Date of Patent: Feb. 4, 2014

(54) DIGITAL DOWNCONVERSION AND FAST CHANNEL SELECTION OF NARROWBAND SIGNALS USING A WIDE BAND RF TUNER

(75) Inventors: Subramanian Harish Krishnan, Bangalore (IN); Saurabh Mishra, Madhepura (IN); Parag Naik, Bangalore (IN); Subrahmanya Kondageri Shankaraiah, Bangalore (IN); Gururaj Padki, Bangalore (IN); Santosh Billava, Kundapura (IN)

(73) Assignee: Saankhya Labs Private Limited, Bangalore (IN)

( * ) Notice: Subject to any disclaimer, the term of this patent is extended or adjusted under 35 U.S.C. 154(b) by 0 days.

(21) Appl. No.: 13/447,089

(22) Filed: Apr. 13, 2012

(65) Prior Publication Data

US 2012/0269300 A1  Oct. 25, 2012

(30) Foreign Application Priority Data

Apr. 25, 2011 (IN) .............................. 1403/CHE/2011

(51) Int. Cl.
  *H04L 27/06* (2006.01)
(52) U.S. Cl.
  USPC ........................................... 375/340; 725/68

(58) Field of Classification Search
  None
  See application file for complete search history.

(56) References Cited

U.S. PATENT DOCUMENTS

| | | | | |
|---|---|---|---|---|
| 5,812,609 A | * | 9/1998 | McLochlin | 375/340 |
| 2010/0210229 A1 | * | 8/2010 | Inako et al. | 455/190.1 |
| 2010/0246685 A1 | * | 9/2010 | Matthews | 375/240.25 |

* cited by examiner

*Primary Examiner* — Leon-Viet Nguyen
(74) *Attorney, Agent, or Firm* — Klarquist Sparkman, LLP (57) ABSTRACT

A wide band receiver to select and demodulate an input signal with single scan spectrum sensing by performing filtering on the input signal in digital domain to achieve improved selectivity and sensitivity is provided. The input signal includes one or more narrowband radio frequency (RF) signals. The wide band receiver includes a wide band tuner that down converts the one or more narrowband RF signals to one or more IF signals. An analog to digital converter (ADC) converts the one or more IF signals to one or more digital signals. A filter rejects out-of-band signals from the one or more digital signals to achieve the improved selectivity. A numeric controlled oscillator (NCO) selects at least one narrowband digital signal from the digital signals based on a phase value obtained from a spectrum selection control unit. A demodulator demodulates the narrowband digital signal to obtain a demodulated digital signal.

15 Claims, 7 Drawing Sheets

DIGITAL DOWNCONVERSION AND FAST CHANNEL SELECTION OF NARROWBAND SIGNALS USING A WIDE BAND RF TUNER

BACKGROUND

1. Technical Field

The embodiments herein generally relate to demodulation techniques in a receiver, and, more particularly, to digital downconversion and fast channel selection of narrowband signals using a wide band RF tuner in the receiver.

2. Description of the Related Art

A tuner is primarily designed to receive and down-convert the wireless and wire-line signals from radio frequency (RF) signal to the required intermediate frequency (IF). Typically, the tuner is designed based on the application and bandwidth of the signal that needs to be received. When a single tuner is used to receive signals with multiple bandwidths, it fails to meet selectivity and sensitivity requirements for signals with lower bandwidth.

Figure 1:
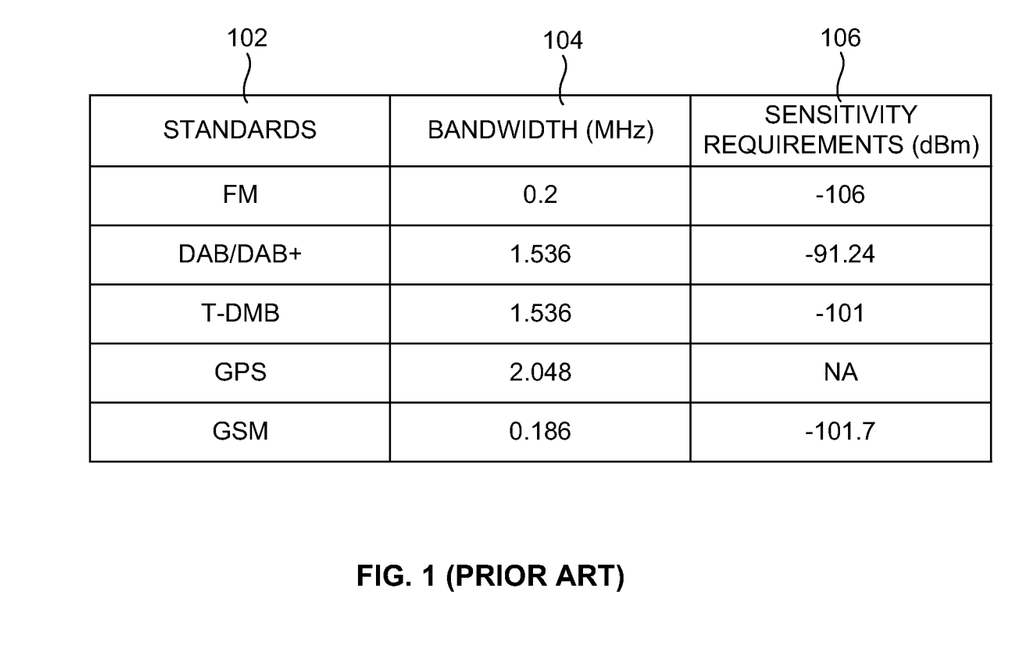
FIG. 1 illustrates a table view having a standards field, a bandwidth field, and sensitivity details of narrowband standards field.

For a signal with bandwidth equals to B1, a tuner is defined as wide band tuner if it is designed to receive a signal with bandwidth equals to at least 2*B1, and signal is defined as a narrowband signal. FIG. 1 is a table view illustrating narrowband standards having standards field 102, a bandwidth field 104, and sensitivity details of narrowband standards field 106. According to the table shown in the FIG. 1, this requires external components to meet required sensitivity if a wide band tuner is used to receive such signals. For an example FM radio with 200 KHz of bandwidth doesn't meet the required selectivity, if the received signal is demodulated in analog domain using an analog front-end designed for a TV standard.

Hence, a typical narrowband demodulator uses a dedicated analog front-end to select such a narrowband signal, which further requires multiple scan to detect all active band signals, by demodulating the selected band signals in digital or analog domain. Additionally, narrowband demodulation on a multi-standard platform that are also capable of demodulating a wide band Analog/Digital signals, requires additional analog components to meet selective and sensitivity requirements for individual standards, and thus increases the overall area, complexity, and the cost.

Most of the conventional narrowband receivers use a narrowband SAW (surface acoustic wave) filter, or analog band pass filters for required band signal selection. In such receivers, the overall performance of the receiver is highly influenced by analog filters that are used to reject adjacent band signals. Typically, such filters are made of crystal, and are limited to 10 dB rejection without forfeiting phase linearity. It is also required to use multiple stages for filtering, to achieve selectivity and sensitivity requirements of a receiver. This also increases the overall area, power consumption, complexity, and the cost.

Recent, state-of-art digital technology has made an attempt to demodulate analog standards in digital domain, which has simplified signal gain control and filtering required for adjacent channel rejection. Such digital filters are cheap to implement, and may have precisely linear phase, reliable compared to analog filters, and can be configured based upon performance requirements. Most of the existing digital receivers perform filtering in analog domain for an active band signal selection, and only demodulation is done in digital domain.

Figure 2:
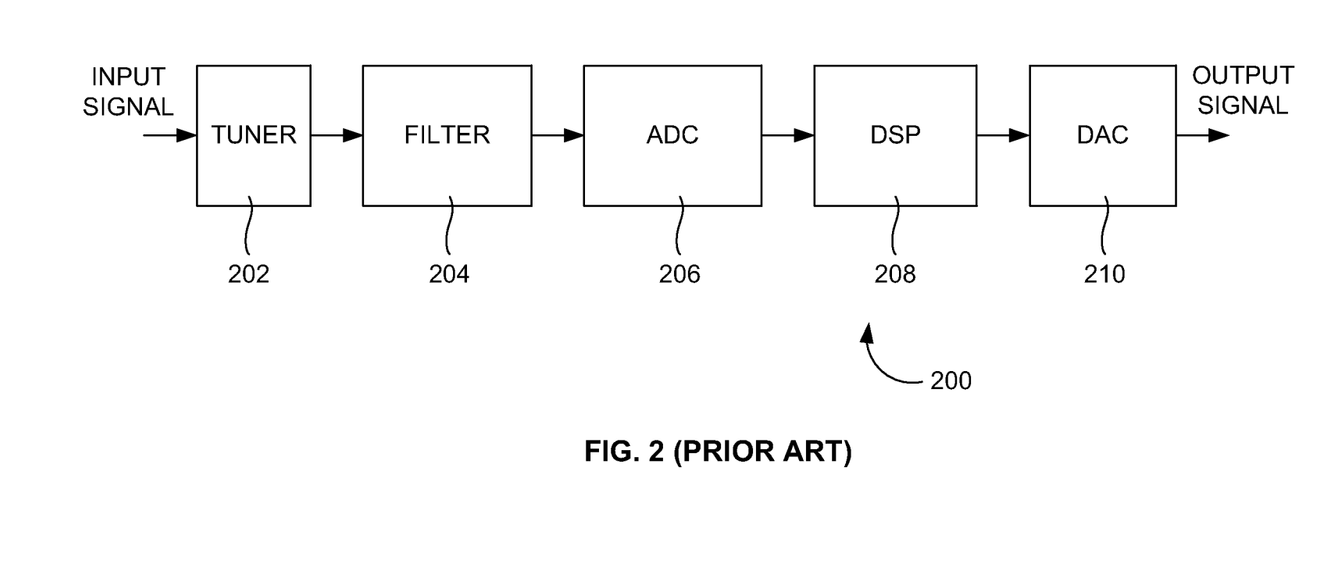
FIG. 2 illustrates a block diagram of a typical wide band receiver.

FIG. 2 illustrates a block diagram of a typical wide band receiver 200 according. The wide band receiver 200 includes a tuner 202, a filter 204, an analog to digital converter (ADC) 206, a digital signal processor (DSP) 208, and a digital to analog converter (DAC) 210. The tuner 202 receives a required narrowband signal and down converts into an intermediate frequency (IF) signal. The tuner 202 may select multiple narrowband signals at the same time. The filter 204 performs filtering in the analog domain before the IF signals are converted to digital signals.

The filter 204 rejects unwanted adjacent band signals from the IF signals. In the FIG. 2, an analog band pass filter or a surface acoustic wave (SAW) filter is used to reject the unwanted adjacent band signals. The ADC 206 converts the IF signal to a digital signal. The DSP 208 processes the signal in a digital domain for adjacent band signal rejections, sample rate conversions, and demodulation. For analog standards, the DAC 210 is used to convert demodulated digital signals to a required analog signal. The receiver 200 requires one or more band pass filters to perform filtering in the analog domain before the IF signals are converted to digital signals. Therefore, all narrowband signals are not detected at the output of the ADC 206 and the DSP 208, since the filtering is performed in the analog domain. Accordingly, there remains a need for a demodulation technique to achieve selective and sensitivity of signals in a receiver without using any external component.

SUMMARY

In view of the foregoing, an embodiment herein provides a wide band receiver to perform a digital downconversion and fast channel selection of one or more narrowband signals with single scan spectrum sensing. The wide band receiver includes a tuner that down converts the one or more plurality of narrowband signals to one or more Intermediate Frequency (IF) signals by selecting the one or more narrowband signals using the single scan spectrum sensing, an analog to digital converter (ADC) that converts the one or more IF signals to one or more digital signals, a spectrum selection control unit that selects at least one digital signal from the one or more digital signals based on a specified spectrum selection value, a filter that rejects out-of-band signals from the one or more digital signals to achieve improved selectivity.

The specified spectrum selection value is computed in real time or obtained from a Look up table. Sensitivity of the wide band receiver is improved by controlling a radio frequency (RF) gain of the wide band receiver based on an energy measurement of an in-band signal and the out-of-band signals from the one or more digital signals. The channel change times is reduced in the wide band receiver is reduced based on the specified spectrum selection value.

Selectivity is defined as the ability of the wide band receiver 300 to select a particular frequency band (e.g., a bandwidth) from all other available frequency bands at an input of the wide band receiver. Sensitivity is defined as a minimum input signal required (sensitivity requirements) to produce a specified signal-to-noise (S/N) ratio at an output of the wide band receiver.

In another aspect, a wide band receiver to select and demodulate an input signal with single scan spectrum sensing, by performing filtering on the input signal in a digital domain to achieve improved selectivity and sensitivity is provided. The wide band receiver includes a wide band tuner that down converts the input signal to an intermediate frequency (IF) signal. The input signal is at least one of a wide band radio frequency (RF) signal or one or more narrowband RF signals within the wide band RF signal. The wide band tuner selects the one or more narrowband RF signals using the single scan spectrum sensing. The one or more narrowband RF signals are down converted to one or more IF signals.

The wide band receiver includes an analog to digital converter (ADC) that converts the one or more IF signals to one or more digital signals, a filter that rejects out-of-band signals from the one or more digital signals to achieve the improved selectivity, a Numeric Controlled Oscillator (NCO) that selects at least one digital signal from the one or more digital signals based on a phase value obtained from a spectrum selection control unit, and a demodulator that demodulates the at least one digital signal based on the phase value to obtain a demodulated digital signal.

The wide band receiver further includes a noise removal filter that rejects unwanted components from the demodulated digital signal, and a digital to analog converter that converts the demodulated digital signal to an analog signal. A radio frequency (RF) gain of the wide band receiver is controlled based on an energy measurement of an in-band signal and the out-of-band signals from the one or more digital signals. The out-of-band signals are rejected using the filter. One or more parameters of the filter are controlled and configured based on the selectivity and sensitivity requirement of the narrowband digital signal from the one or more digital signals. The one or more parameters include a cut-off frequency, an in-band gain, and an out-of-band attenuation.

The one or more IF signals are converted to the one or more digital signals without performing any additional band pass filtering in an analog domain. The channel change times in the receiver is reduced based on the phase value. The out-of-band signals are rejected using a filter. One or more parameters of the filter are controlled and configured based on the selectivity and sensitivity requirement of the at least one narrowband digital signal from the one or more digital signals. The one or more parameters include a cut-off frequency, an in-band gain, and an out-of-band attenuation.

In yet another aspect, a method of performing a digital downconversion and fast channel selection of one or more narrowband signals from an input signal with single scan spectrum sensing in a receiver is provided. The method reduces channel change times in the receiver. The method includes (i) down converting the one or more narrowband signals to one or more intermediate frequency (IF) signals, (ii) converting the one or more IF signals to one or more digital signals, (iii) filtering out-of-band signals from the one or more digital signals to achieve an improved selectivity, (iv) selecting at least one narrowband digital signal from the one or more digital signals based on a phase value obtained from a spectrum selection control unit, and (v) demodulating the at least one narrowband digital signal to obtain a demodulated digital signal.

The method further includes (i) determining whether the demodulated digital signal requires a digital to analog conversion, and (ii) converting the demodulated digital signal to an analog signal. The one or more IF signals are converted to the one or more digital signals without performing any additional band pass filtering in an analog domain. The channel change times in the receiver is reduced based on the phase value. The out-of-band signals are rejected using a filter. One or more parameters of the filter are controlled and configured based on the selectivity and sensitivity requirement of the at least one narrowband digital signal from the one or more digital signals. The one or more parameters include a cut-off frequency, an in-band gain, and an out-of-band attenuation.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned there remains for a demodulation technique to achieve selective and sensitivity in a receiver without using any external component. The embodiments herein achieve this by providing a wide band tuner that down converts one or more narrowband signals by performing filtering in digital domain to achieve required sensitivity. Further, a single scan is performed to detect all active narrowband signals, using a configurable down-conversion. The sensitivity is improved by controlling a radio frequency (RF) gain, using energy measurement of out-of band signals after oversampled analog to digital conversion. After filtering and selecting the active narrowband signals, these signals are demodulated to obtain demodulated narrowband digital signals. Referring now to the drawings, and more particularly to FIGS. 3 through 7, where similar reference characters denote corresponding features consistently throughout the figures, there are shown preferred embodiments.

Figure 3:
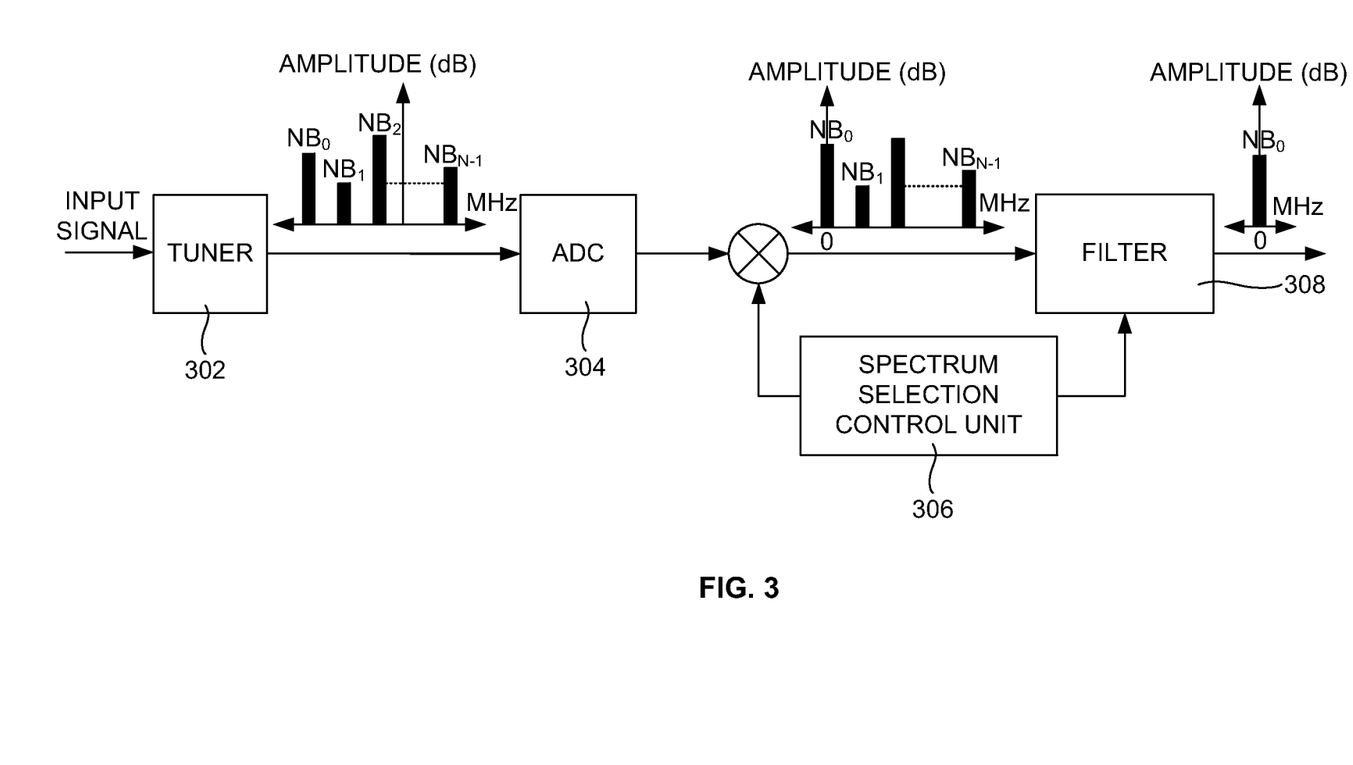
FIG. 3 illustrates a block diagram of a wide band receiver for digital downconversion and fast channel selection of one or more narrowband signals with a single scan spectrum sensing according to an embodiment herein.

FIG. 3 illustrates a block diagram of a wide band receiver 300 for digital downconversion and fast channel selection of one or more narrowband signals with a single scan spectrum sensing according to an embodiment herein. The receiver 300 includes a tuner 302, an analog to digital converter (ADC) 304, a spectrum selection control unit 306, and a filter 308. In one embodiment, the tuner 402 is a wide band tuner. The tuner 302 receives an input signal (e.g., the one or more narrowband signals) down converts the one or more narrowband signals to one or more Intermediate Frequency (IF) signals. The one or more IF signals may be one or more standard IF signals or one or more Low IF signals or one or more Zero IF signals. In one embodiment, the tuner 302 selects the narrowband signals (e.g., $NB_0$, $NB_1$, ... $NB_{N-1}$) using the single scan spectrum sensing.

The ADC 304 is coupled to the tuner 302. The ADC 304 converts the one or more IF signals to one or more digital signals. The spectrum selection control unit 306 is coupled to the filter 308. The spectrum selection control unit 306 selects at least one digital signal (e.g., a narrowband digital signal $NB_0$) from the one or more digital signals (e.g., $NB_0$, $NB_1$, ... $NB_{N-1}$) based on an appropriate spectrum selection value. In one embodiment, the spectrum selection value is computed in real time or obtained from a Look up table.

Similarly, other digital signals (e.g., $NB_1$, ... $NB_{N-1}$) are selected based on corresponding spectrum selection value. The filter 308 rejects out-of-band signals from the one or more digital signals (e.g., $NB_0$, $NB_1$, ... $NB_{N-1}$) to achieve improved selectivity. A plurality of parameters of the filter 308 are controlled and configured based on the selectivity and sensitivity requirement of a specified narrowband digital signal (e.g., the digital signal $NB_0$). The one or more parameters include a cut-off frequency, an in-band gain, and an out-of-band attenuation of the filter 308.

Selectivity is defined as the ability of the receiver 300 to select a particular frequency band (e.g., a bandwidth as shown in FIG. 1) from all other available frequency bands at an input of the receiver 300. The sensitivity of the receiver 300 is improved by controlling a radio frequency (RF) gain of the receiver 300 based on an energy measurement of an in-band signal and the out-of-band signals from the one or more digital signals. Sensitivity is defined as a minimum input signal required (sensitivity requirements as shown in FIG. 1 for each standard) to produce a specified signal-to-noise (S/N) ratio at an output of the receiver 300.

Figure 4:
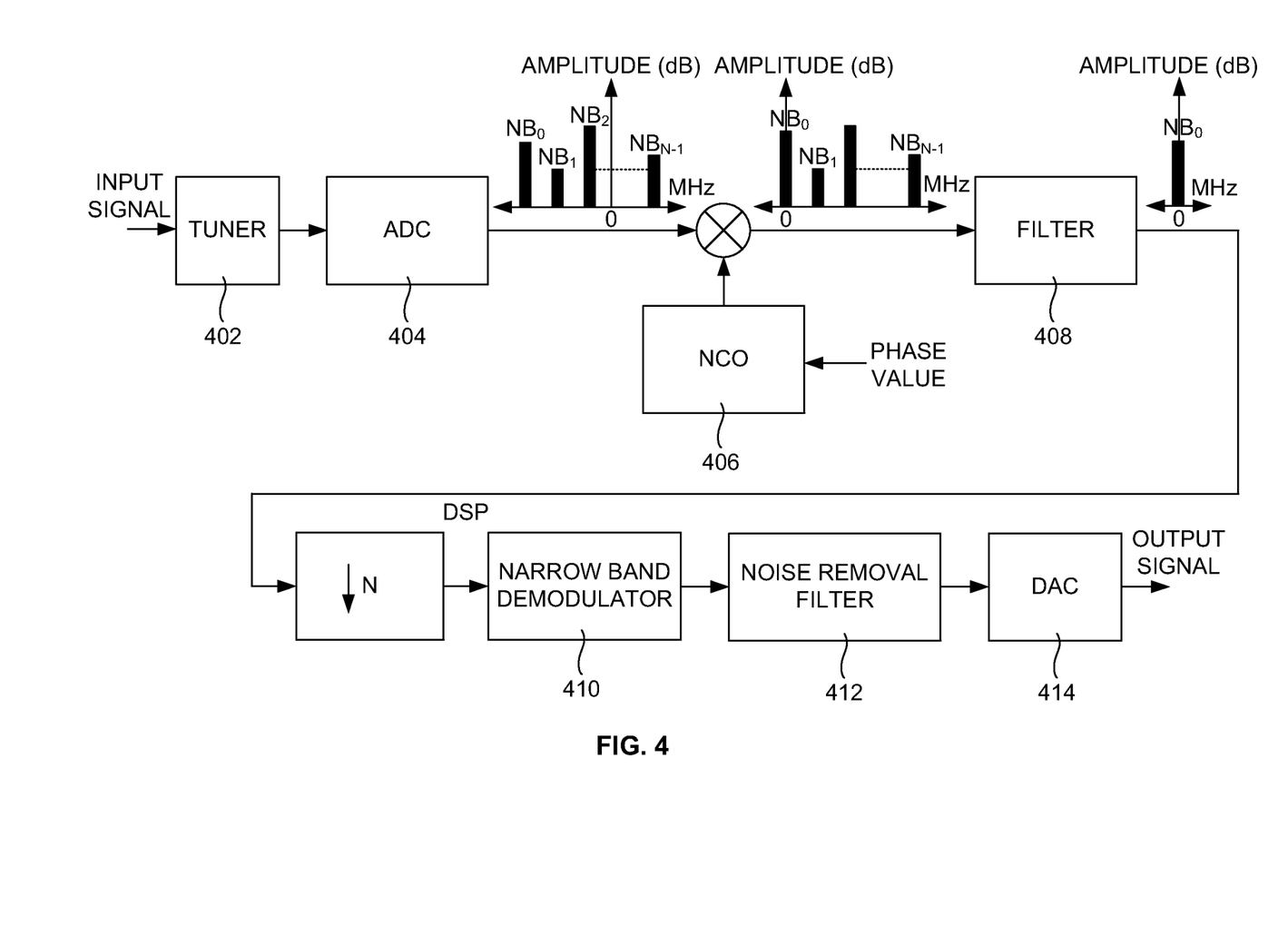
FIG. 4 illustrates block diagram of the receiver of FIG. 3 for detecting one or more active narrowband RF signals using the single scan spectrum according to an embodiment herein.

With reference to FIG. 3, FIG. 4 illustrates block diagram of the receiver 300 of FIG. 3 for detecting one or more active narrowband RF signals using the single scan spectrum according to an embodiment herein. In an embodiment, Frequency Modulation bands are considered as an example for narrowband signals. The receiver 300 includes a tuner 402, an analog to digital converter (ADC) 404, a numeric controlled oscillator (NCO) 406, a filter 408, a narrowband demodulator 410, a noise removal filter 412, and a digital to analog converter (DAC) 414. In one embodiment, the tuner 402 is a wide band tuner. The wide band tuner 402 selects and down converts the narrowband RF signals (e.g., FM band signals in Mega Hertz (MHz)—$N_{B0}$, $N_{B1}$, ... $NB_{N-1}$) to required intermediate frequency (IF) signals. The one or more IF signals may be (i) one or more standard IF signals or (ii) one or more Low IF signals or (iii) one or more Zero IF signals.

In one embodiment, the wide band tuner 402 down converts an input signal to an intermediate frequency (IF) signal. The input signal is either a wide band RF signal, or the one or more narrowband RF signals within the wide band RF signal.

In one embodiment, the tuner 402 performs down conversion (e.g., frequency translation) of the input signal to the IF signal.

The wide band tuner 402 selects the one or narrowband RF signals using the single scan spectrum sensing. The ADC 404 is coupled to the tuner 402. The ADC 404 converts the one or more IF signals to one or more digital signals (e.g., $NB_0$, $NB_1$, ... $NB_{N-1}$). The output from the ADC 404 is one or more digitized IF signals. In one embodiment, the ADC 404 processes the one or more IF signals in a digital domain for adjacent band rejection, sample rate conversions, and narrowband demodulation (e.g., FM demodulation) without using any filtering in analog domain. The digitized IF signal includes several narrow band signals. A specified narrowband signal requires frequency translation (down-conversion) to a baseband signal (or a zero IF signal) for further processing in digital domain.

As the digitized IF signal includes several channels, a channel change request (specifying a new spectrum or a phase value to the tuner 402) will not require reprogramming the tuner for a requested channel. This in turn reduces the channel change time between two or more channels.

A narrow broadcast band consists of N number of narrowband signals (e.g., $FM_0$, $FM_1$, $FM_2$, ... $FM_{N-1}$). Once the one or more IF signals are converted to the one or more digital signals, an in-band and an out-of-band energy are measured to control the RF gain and an intermediate frequency (IF) gain of the receiver 300 to improve selectivity and sensitivity of a band signal (e.g., a FM band signal). Selectivity is defined as the ability of the receiver 300 to select a particular frequency band from all other available frequency bands at an input of the receiver 300. Sensitivity is defined as a minimum input signal required to produce a specified signal-to-noise (S/N) ratio at an output of the receiver 300.

The NCO 406 is coupled to the filter 408. The NCO 406 selects the at least one digital signal (e.g., $NB_0$) from the one or more digital signals (e.g., $NB_0$, $NB_1$, ... $NB_{N-1}$) based on a phase value obtained from the spectrum selection control unit 306. For example, in digital domain, the NCO 406 down converts at least one narrowband signal (e.g., a digital signal—$FM_0$ that corresponds to $NB_0$) to a baseband signal that is further filtered (using the filter 408) to reject any unwanted adjacent bands, image components, and alias components (e.g., out-of-band signals) required before down-sampling using a sample rate converter to achieve improved selectivity of the at least one narrowband digital signal.

One or more parameters of the filter 408 are controlled and configured based on the selectivity and sensitivity requirement of a specified narrowband digital signal. The plurality of parameters includes a cut-off frequency, an in-band gain, and an out-of-band attenuation of the filter 308. The out-of-band signals are the signals other than the specified spectrum. The out-of-band signals have a spectrum substantially outside of the spectrum selection value. In one embodiment, the specified spectrum is a desired spectrum or a desired frequency band required to be demodulated in a digital domain to recover a transmitted signal.

The narrowband demodulator 410 is coupled to the filter 408. The narrowband demodulator 410 demodulates the digital signal based on the phase value to obtain a demodulated digital signal. In one embodiment, the demodulator 410 is a typical demodulator that can demodulate the digital signal. The RF gain of the receiver 300 is controlled based on an energy measurement of an in-band signal and the out-of-band signals from the one or more digital IF signals.

In one embodiment, the out-of-band signals are rejected, controlled and configured based on a selectivity and sensitivity requirement of the at least one narrowband RF signal from the one or more narrowband RF signals. In one embodiment, the demodulated digital signal is a final output. The noise removal filter 412 is coupled to the narrowband demodulator 410. The noise removal filter 412 rejects unwanted components from the demodulated digital signal. In other words, post demodulation, performance improvement techniques such as noise filtering is performed to reject unwanted components from the narrowband signals.

The DAC 414 is coupled to the noise removal filter 412. The DAC 414 converts the demodulated digital signal received from the noise filter 412 to an analog signal. In one embodiment, the DAC 414 converts the demodulated digital signal to the analog signal only when a digital to analog conversion is required. Similarly, other narrowband signals (e.g., $FM_1$, $FM_2$, ... $FM_{N-1}$, corresponding to $NB_0$, $NB_1$, ... $NB_{N-1}$) are selected in digital domain by changing the phase value of the NCO 406 by a required phase value (e.g., a phase value received from the spectrum selection control unit 306 of FIG. 3). In other words, the digital signals are demodulated and converted to baseband signals that are further filtered to reject any unwanted adjacent bands, image components, and alias components (e.g., out-of-band signals) required before down-sampling using a sample rate converter to achieve improved selectivity of the digital signals.

Thus, all the active narrowband signals (e.g., the digital signals) are detected based on a Signal to Noise Ratio (SNR) measurement after narrowband demodulation. In a normal FM mode, for detecting the active narrowband signals, analog filters (e.g., SAW filter or band pass filter) may be used to reject adjacent band to improve the performance of the receiver 300. Further, the out-of-band signals are rejected, controlled and configured based on a selectivity and sensitivity requirement of the one or more narrowband signals.

In one embodiment, the receiver 300 is also capable of detecting the narrowband signals (e.g., the one or more digital signals) for other standards such as a Digital Audio Broadcasting (DAB) standard, a DAB+ standard, a Digital Multimedia Broadcasting-Terrestrial (T-DMB) standard, a Global Positioning System (GPS) standard, a Global System for Mobile Communications (GSM) standard, and/or any other similar narrowband standards. The receiver 300 selects and demodulates an input signal using the single scan spectrum. For example, a narrowband signal (e.g., a FM reception is considered for a FM standard) is transmitted using an analog front end designed for television (TV) standards, which is further demodulated in digital domain to achieve a performance of Hi-Fi FM receivers.

Figure 5:
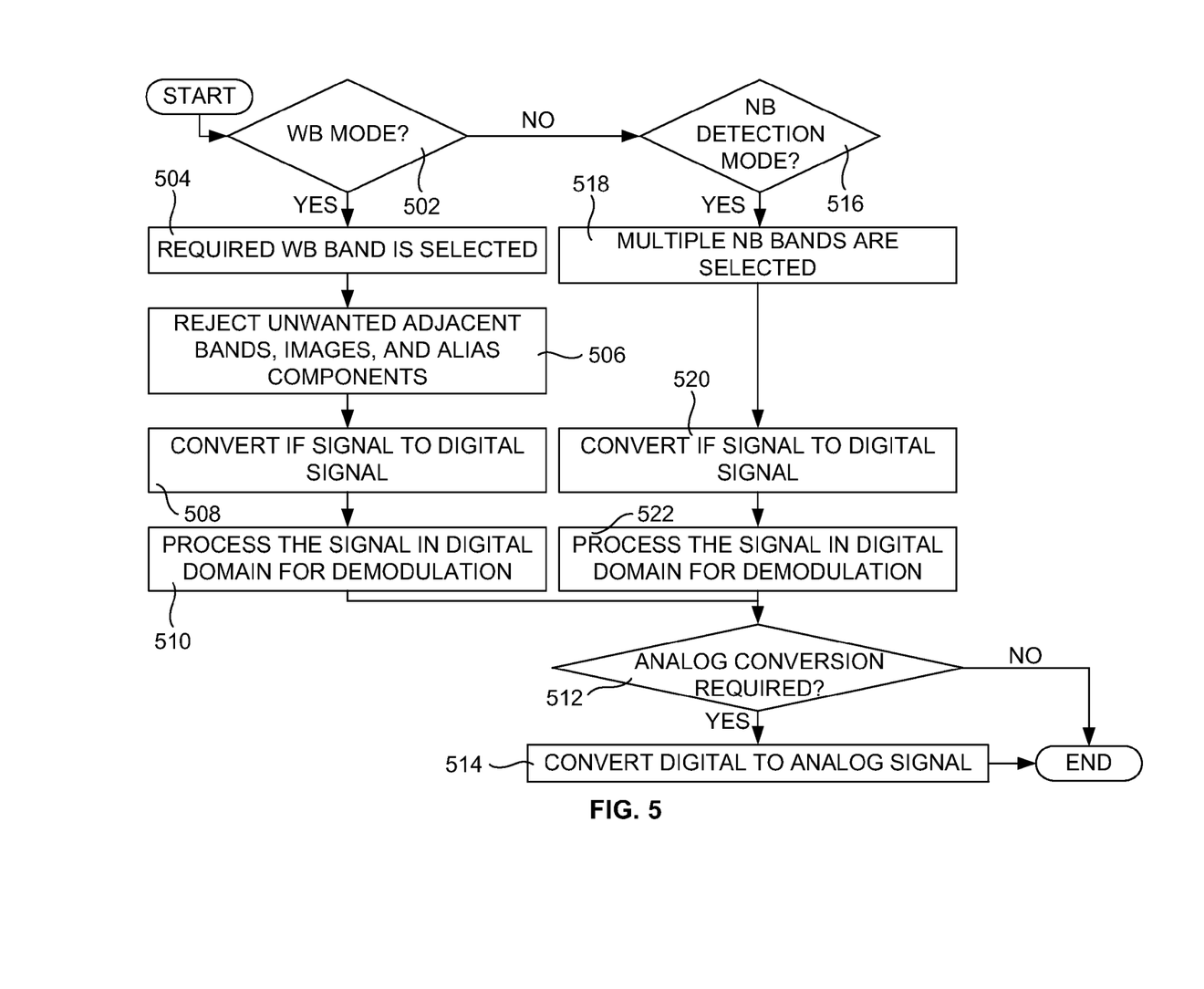
FIG. 5 is a flow diagram illustrating a method of demodulating narrowband signals on a TV receiver according to an embodiment herein.

With reference to FIG. 3 and FIG. 4, FIG. 5 is a flow diagram illustrating a method of demodulating narrowband signals on a TV receiver according to an embodiment herein. In one embodiment, the TV receiver is the same receiver 300. In step 502, it is checked whether it is a wide band (WB) mode (e.g., a TV mode). If yes, then a required band (e.g., a FM signal) is selected in step 504. Unwanted adjacent bands, images, and alias components are rejected using the filter 408 of FIG. 4 in step 506. In step 508, an IF signal is converted to a digital signal (e.g., using the ADC 404 of FIG. 4). In step 510, the digital signal is processed in a digital domain for sample rate conversions, and demodulation to obtain a demodulated digital signal (e.g., using the narrowband demodulator 410 of FIG. 4). In step 512, it is checked whether the demodulated digital signal requires an analog conversion. If yes, the demodulated digital signal is converted to a required analog signal (e.g., using the DAC 414 of FIG. 4) in step 514. Else (if No), the process is terminated.

In step 516, it is checked whether it is a narrowband (NB) detection mode (e.g., a FM detection mode). If it is a narrowband detection mode, then multiple narrowband signals (e.g., FM band signals) are selected in step 518. In narrowband detection mode, it is required to bypass analog band pass filter or SAW filter used in analog-front-end using the single scan spectrum sensing. In step 520, an analog to digital conversion is performed on the multiple narrowband signals (e.g., selected FM bands). In step 522, the narrowband signals (e.g., the FM bands) are processed in a digital domain for adjacent band signal rejections, sample rate conversions, and demodulation to obtain demodulated digital signals (e.g., demodulated digital bands) and the step 512 is repeated. Demodulation is performed in digital domain along with performance improvement techniques such as noise filtering in FM normal mode. If the condition in the step 512 is true (if Yes), the step 514 is repeated. Else (If No), the process is terminated.

Figure 6:
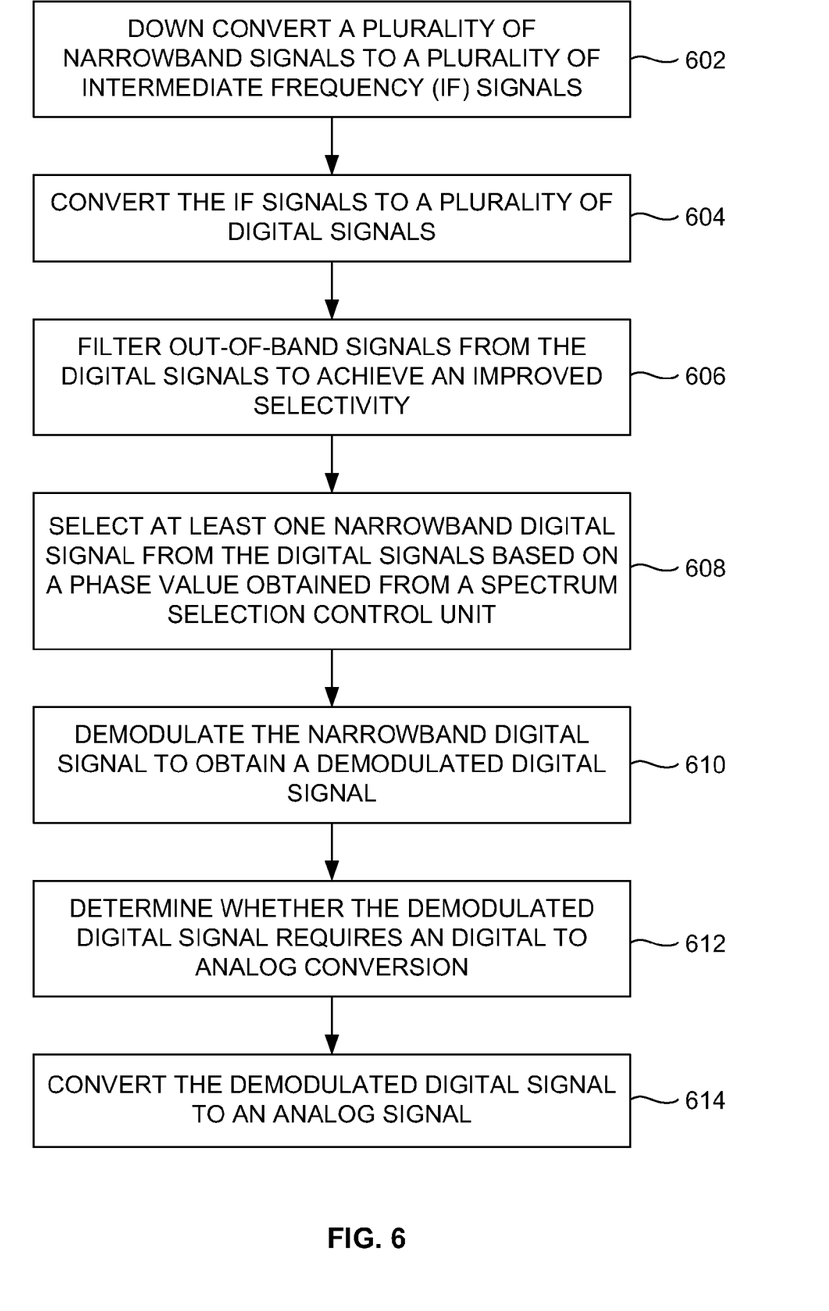
FIG. 6 is a flow diagram illustrating a method performing a digital downconversion and fast channel selection of one or more narrowband signals from an input signal with a single scan spectrum sensing in the receiver of FIG. 3 according to an embodiment herein.

FIG. 6 is a flow diagram illustrating a method performing a digital downconversion and fast channel selection of one or more narrowband signals from an input signal with a single scan spectrum sensing in the receiver 300 of FIG. 3 according to an embodiment herein. In step 602, the one or more narrowband signals are down converted to one or more intermediate frequency (IF) signals (e.g., using the tuner 402 of FIG. 4). The tuner 402 selects the one or more narrowband signals using the single scan spectrum sensing. In step 604, the IF signals are converted to one or more digital signals (e.g., using the ADC 404 of FIG. 4).

In another embodiment, the IF signals are converted to one or more narrowband digital IF signals without performing any additional band pass filtering in an analog domain. In one embodiment, as shown in FIG. 3, the receiver 300 does not include a filter between the tuner 302 and the ADC 304. In another embodiment, as shown in FIG. 4, the receiver 300 does not include a filter between the tuner 402 and the ADC 404. This ensures that all the digital signals can still be selected based on corresponding spectrum selection value without performing filtering in the analog domain. In step 606, out-of-band signals are rejected from the digital signals to achieve an improved selectivity (e.g., using the filter 408 of FIG. 4).

In step 608, at least one narrowband digital signal from the digital signals is selected (e.g., using the NCO 406 of FIG. 4) based on a phase value (e.g., a specified spectrum selection value) obtained from the spectrum selection control unit 306 of FIG. 3. In one embodiment, the at least one digital signal is a narrowband digital signal. In another embodiment, the channel change times in the receiver 300 is reduced based on the phase value. Similarly, other narrowband digital signals are selected by changing the phase value. In step 610, the narrowband digital signal is demodulated to obtain a demodulated digital signal (e.g., using the narrowband demodulator 410 of FIG. 4). In one embodiment, the digital signal is demodulated based on the phase value.

The RF gain of the receiver 300 is controlled based on an energy measurement of an in-band signal and the out-of-band signals from the IF signals/digital signals. In step 612, it is checked whether the demodulated digital signal requires (e.g., a demodulated narrowband digital signal) a digital to analog conversion. In step 614, the demodulated narrowband digital signal is converted to an analog signal (e.g., using the DAC 414). Similarly, other demodulated narrowband digital signals are converted to analog signals. In one embodiment, unwanted components are rejected from the one or more demodulated narrowband digital signals (e.g., using the noise removal filter 412 of FIG. 4) before converting the demodulated narrowband digitals signals to the analog signals.

Figure 7:
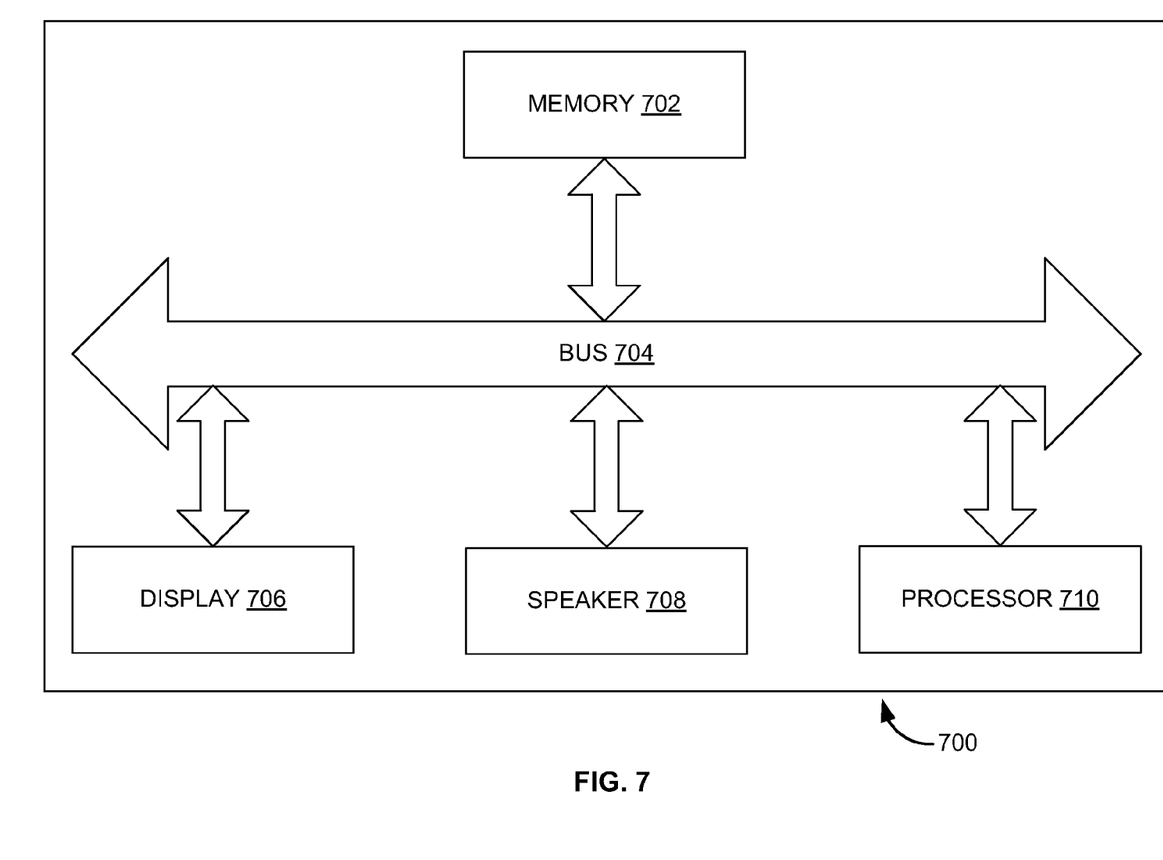
FIG. 7 illustrates an exploded view of a receiver having an a memory having a set of computer instructions, a bus, a display, a speaker, and a processor capable of processing the set of computer instructions to perform any one or more of the methodologies herein, according to an embodiment herein.

FIG. 7 illustrates an exploded view of a receiver 700 having an a memory 702 having a set of computer instructions, a bus 704, a display 706, a speaker 708, and a processor 710 capable of processing the set of computer instructions to perform any one or more of the methodologies herein, according to an embodiment herein. The processor 710 may also enable digital content to be consumed in the form of video for output via one or more displays 706 or audio for output via speaker and/or earphones 708. The processor 710 may also carry out the methods described herein and in accordance with the embodiments herein. Digital content may also be stored in the memory 702 for future processing or consumption. The memory 702 may also store program specific information and/or service information (PSI/SI), including information about digital content (e.g., the detected information bits) available in the future or stored from the past.

A user of the receiver 700 may view this stored information on display 706 and select an item for viewing, listening, or other uses via input, which may take the form of keypad, scroll, or other input device(s) or combinations thereof. When digital content is selected, the processor 710 may pass information. The content and PSI/SI may be passed among functions within the receiver 700 using bus 704. In one embodiment, the receiver 700 is the same receiver 300 of FIG. 3 and FIG. 4.

The wide band tuner 402 of the receiver 300 allows fast scanning to detect active narrowband signals (e.g., all FM bands) in a single scan using configurable digital domain down-conversion for band selection. This is further used to improve channel change time by configuring digital down-conversion to a phase value required for a channel selection. The phase value is obtained from the spectrum selection control unit 306 of FIG. 3. The above method provides an improved sensitivity required for narrowband signal standards by controlling the RF gain based on post ADC out-of-band energy measurement.

Further, performance improvements techniques such as dithering can be used to improve SNR after the ADC (e.g., the ADC 304 or the ADC 404) by reducing quantization noise. This method reduces chip cost, area and power by reusing the components of a multi-standard wide band receiver 300 to select and demodulate narrowband signals in digital domain. Further, the IF signals are converted to one or more narrowband digital signals without performing any additional band pass filtering in analog domain. This ensures that all the digital signals (e.g., active digital signals) can still be selected based on corresponding spectrum selection value without performing filtering in the analog domain.

The receiver 300 is also capable of detecting the narrowband signals (e.g., the one or more narrowband digital signals) for other standards such as a Digital Audio Broadcasting (DAB) standard, a DAB+ standard, a Digital Multimedia Broadcasting-Terrestrial (T-DMB) standard, a Global Positioning System (GPS) standard, a Global System for Mobile Communications (GSM) standard, and/or any other similar narrowband standards.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A wide band receiver to perform a digital downconversion and fast channel selection of a plurality of narrowband signals with single scan spectrum sensing, said wide band receiver comprising:
 a tuner that down converts said plurality of narrowband signals to a plurality of Intermediate Frequency (IF) signals by selecting said plurality of narrowband signals using said single scan spectrum sensing;
 an analog to digital converter (ADC) that converts said plurality of IF signals to a plurality of digital signals;
 a spectrum selection control unit that selects at least one digital signal from said plurality of digital signals based on a specified spectrum selection value; and
 a filter that rejects out-of-band signals from said plurality of digital signals to achieve improved selectivity,
 wherein a plurality of parameters of said filter are controlled and configured based on the selectivity and sensitivity requirement of said at least one digital signal.

2. The wide band receiver of claim 1, wherein said specified spectrum selection value is computed in real time or obtained from a Look up table.

3. The wide band receiver of claim 1, wherein sensitivity of said wide band receiver is improved by controlling a radio frequency (RF) gain of said wide band receiver based on an energy measurement of an in-band signal and said out-of-band signals from said plurality of digital signals.

4. The wide band receiver of claim 1, wherein channel change times is reduced in said wide band receiver based on said specified spectrum selection value.

5. A wide band receiver to select and demodulate an input signal with single scan spectrum sensing, by performing filtering on said input signal in a digital domain to achieve improved selectivity and sensitivity, said wide band receiver comprising:
 a wide band tuner that down converts said input signal to an intermediate frequency (IF) signal, wherein said input signal is at least one of a wide band radio frequency (RF) signal or a plurality of narrowband RF signals within said wide band RF signal, wherein said wide band tuner selects said plurality of narrowband RF signals using said single scan spectrum sensing, wherein said plurality of narrowband RF signals are down converted to a plurality of IF signals;
 an analog to digital converter (ADC) that converts said plurality of IF signals to a plurality of digital signals;
 a filter that rejects out-of-band signals from said plurality of digital signals to achieve said improved selectivity;
 a Numeric Controlled Oscillator (NCO) that selects at least one narrowband digital signal from said plurality of digital signals based on a phase value obtained from a spectrum selection control unit; and
 a demodulator that demodulates said at least one narrowband digital signal based on said phase value to obtain a demodulated digital signal.

6. The wide band receiver of claim 5, further comprises a noise removal filter that rejects unwanted components from said demodulated digital signal.

7. The wide band receiver of claim 6, further comprises a digital to analog converter that converts said demodulated digital signal to an analog signal.

8. The wide band receiver of claim 5, wherein a radio frequency (RF) gain of said wide band receiver is controlled based on an energy measurement of an in-band signal and said out-of-band signals from said plurality of digital signals.

9. The wide band receiver of claim 5, wherein said out-of-band signals are rejected using said filter, wherein a plurality of parameters of said filter are controlled and configured based on the selectivity and sensitivity requirement of said narrowband digital signal.

10. The wide band receiver of claim 9, wherein said plurality of parameters comprises of a cut-off frequency, an in-band gain, and an out-of-band attenuation.

11. A method of performing a digital downconversion and fast channel selection of a plurality of narrowband signals from an input signal with single scan spectrum sensing and thus reducing channel change times in a receiver, said method comprising:
  (i) down converting said plurality of narrowband signals to a plurality of intermediate frequency (IF) signals, wherein a tuner selects said plurality of narrowband RF signals using said single scan spectrum sensing;
  (ii) converting said plurality of IF signals to a plurality of digital signals;
  (iii) filtering out-of-band signals from said plurality of digital signals to achieve an improved selectivity;
  (iv) selecting at least one narrowband digital signal from said plurality of digital signals based on a phase value obtained from a spectrum selection control unit; and
  (v) demodulating said at least one narrowband digital signal to obtain a demodulated digital signal, wherein a radio frequency (RF) gain of said receiver is controlled based on an energy measurement of an in-band signal and said out-of-band signals from said plurality of digital signals, wherein said out-of-band signals are rejected using a filter, and wherein a plurality of parameters of said filter are controlled and configured based on the selectivity and sensitivity requirement of said at least one narrowband digital signal.

12. The method of claim 11, further comprising: (vi) determining whether said demodulated digital signal requires a digital to analog conversion; and (vii) converting said demodulated digital signal to an analog signal.

13. The method of claim 11, wherein said plurality of IF signals are converted to said plurality of digital signals without performing any additional band pass filtering in an analog domain.

14. The method of claim 11, wherein said channel change times in said receiver is reduced based on said phase value.

15. The method of claim 11, wherein said plurality of parameters comprises a cut-off frequency, an in-band gain, and an out-of-band attenuation.

\* \* \* \* \*